United States Patent
Wada

(10) Patent No.: US 11,117,356 B2
(45) Date of Patent: Sep. 14, 2021

(54) COMPOSITE STRUCTURE

(71) Applicant: TOTO LTD., Fukuoka (JP)

(72) Inventor: Takuma Wada, Fukuoka (JP)

(73) Assignee: TOTO LTD., Fukuoka (JP)

( * ) Notice: Subject to any disclaimer, the term of this patent is extended or adjusted under 35 U.S.C. 154(b) by 365 days.

(21) Appl. No.: 16/333,161

(22) PCT Filed: Sep. 14, 2017

(86) PCT No.: PCT/JP2017/033244
§ 371 (c)(1),
(2) Date: Mar. 13, 2019

(87) PCT Pub. No.: WO2018/052076
PCT Pub. Date: Mar. 22, 2018

(65) Prior Publication Data
US 2019/0240961 A1    Aug. 8, 2019

(30) Foreign Application Priority Data

Sep. 14, 2016  (JP) .............. JP2016-179118
Jun. 15, 2017  (JP) .............. JP2017-117744

(51) Int. Cl.
B32B 27/14 (2006.01)
C23C 24/04 (2006.01)
B32B 9/04 (2006.01)

(52) U.S. Cl.
CPC ............ *B32B 27/14* (2013.01); *B32B 9/04* (2013.01); *C23C 24/04* (2013.01); *B32B 2264/10* (2013.01); *B32B 2307/538* (2013.01); *B32B 2307/732* (2013.01)

(58) Field of Classification Search
CPC .......... B32B 2264/10; B32B 2307/538; B32B 2307/732; B32B 27/14; B32B 9/04; C23C 24/04
See application file for complete search history.

(56) References Cited

FOREIGN PATENT DOCUMENTS

| JP | 2003-34003 A | 2/2003 |
|---|---|---|
| JP | 2004-91614 A | 3/2004 |
| JP | 2005-161703 A | 6/2005 |
| JP | 2006-175375 A | 7/2006 |
| JP | 2006-289683 A | 10/2006 |

OTHER PUBLICATIONS

International Search Report from Application No. PCT/JP2017/033244 dated Dec. 5, 2017.

*Primary Examiner* — Lawrence D Ferguson
(74) *Attorney, Agent, or Firm* — Marshall, Gerstein & Borun LLP

(57) ABSTRACT

The composite structure of the present invention includes a substrate, and a structure provided on the substrate surface and having a brittle material as the principal component thereof. The structure is polycrystalline, and the average crystallite size is 100 nm or less. The substrate includes at least a first region containing the substrate surface. The first region includes a filler and a matrix which has a first resin as the principal component thereof. The diameter of 90% of the filler particles (D90) is 1.0-60 μm, inclusive. The surface area fill rate of the filler at the substrate surface per unit area is greater than 10% and no greater than 70%.

22 Claims, 5 Drawing Sheets

COMPOSITE STRUCTURE

TECHNICAL FIELD

The present invention relates to a composite structure.

BACKGROUND ART

A composite structure including a substrate whose surface is provided with a film having desired characteristics is known. Known examples include a composite structure provided with a ceramic film for the purpose of improving the strength of the resin surface and a composite structure provided with a film of ceramics, polymer, or the like for the purpose of imparting insulating properties to a part of the metal surface.

Examples of known film formation techniques include the aerosol deposition method (hereinafter also referred to as the AD method). The AD method is a method of forming a film on the surface of a substrate by causing fine particles of ceramics or the like to collide at high speed with the substrate. When the particle diameter of the fine particles and their speed at collision with the substrate are changed, it is possible to form various structures ranging from green compact-like structures, which are powder aggregates, to dense structures composed of constituent particles having very small crystallite size, for example. The AD method makes it possible to form a dense structure by causing fine particles to collide with a substrate and sufficiently crushing and deforming the fine particles by the impact. If the fine particles do not crush and deform too much, a green compact-like porous structure composed of compacted fine particles is formed.

The AD method employs, for example, a ceramic plate, a glass plate, a metal plate, or the like as the substrate for constructing a relatively dense structure. On the other hand, in the case of a resin plate, it is difficult to use the coating method which requires a step of applying heat such as sintering or thermal spraying. Thus, it was difficult to form a dense film of e.g. ceramics on the surface of the resin plate. Moreover, in the case of forming a structure by the AD method capable of forming a structure on a resin plate at normal temperature, it may be difficult to obtain a desired structure because the resin plate may be scraped off or the fine particles may be bounced back by the resin plate which is an elastic material.

Furthermore, when a structure is formed by the AD method, it may be difficult to obtain a desired structure depending on the surface conditions of the substrate such as large surface roughness.

Japanese Patent Application Publication No. 2004-91614 (Patent Literature 1) states that, by setting the value of DHv2 of the resin plate as the substrate to 7 or more and 33 or less, it is possible to suppress both scraping off of the resin plate and bouncing back of the fine particles and to provide a structure on the surface by the AD method.

Methods of modifying the surface of a resin plate as a substrate are also in consideration.

Japanese Patent Application Publication No. 2003-34003 (Patent Literature 2) states that particles having a hardness higher than that of the resin plate are embedded into the surface of the resin plate to form an underlayer, and a structure is formed on the underlayer by the AD method. The example is described as follows. A thermoplastic resin such as polyethylene terephthalate is used as the resin plate. The resin plate is heated to the glass transition temperature (Tg) or higher for softening, and the surface thereof is coated with a slurry containing aluminum oxide fine particles with submicron particle diameter followed by pressing. As a result, the underlayer is embedded into the surface of the resin plate.

Japanese Patent Application Publication No. 2006-289683 (Patent Literature 3) states that a composite material in which an inorganic material is dispersed in a resin matrix is used to form a substrate, for example, to increase the hardness of the surface of the substrate, thereby enabling formation of a structure by the AD method. It is also stated that the arithmetic average roughness Ra of the surface of the substrate composed of the composite material is reduced to 0.15 µm or less and the ten-point average roughness Rz is reduced to 1.3 µm or less.

Japanese Patent Application Publication No. 2005-161703 (Patent Literature 4) states that an underlayer containing a binder and a hard material is formed on the surface of a resin plate of e.g. PET and a structure is formed on the underlayer by the AD method. It is stated that PVA is used as the binder, for example, and silica fine particles having an average primary particle diameter of 12 nm are used as the hard material, for example.

CITATION LIST

Patent Literatures

Patent Literature 1: Japanese Patent Application Publication No. 2004-91614
Patent Literature 2: Japanese Patent Application Publication No. 2003-34003
Patent Literature 3: Japanese Patent Application Publication No. 2006-289683
Patent Literature 4: Japanese Patent Application Publication No. 2005-161703

SUMMARY OF INVENTION

Problems to be Solved by the Invention

In Patent Literature 1, only specific materials may be used for the resin plate as the substrate, and it is difficult to form a structure on other resin plates by the AD method.

On the other hand, in Patent Literatures 2 to 4, it is possible to form a structure regardless of the type of the resin plate. Patent Literatures 2 to 4 state that particles of a hard material or the like are arranged on the surface of the resin plate, but do not sufficiently consider a specific arrangement state. In particular, no consideration is made on obtaining a sufficiently dense structure on the resin plate.

The conventional methods described in Patent Literatures 2 to 4 use small particles having an average particle diameter of 1 µm or less as the particles to be arranged on the resin plate.

The AD method generally uses submicron particles having a particle diameter of 1 µm or less as raw material particles for forming a structure. The crystallite size of the structure formed by the AD method is as small as 100 nm or less. The AD method has the properties as described above. Thus, in the case of intending to modify the surface of a substrate containing a resin such as a resin plate, formation of a structure with these constituent particles has been conventionally enabled by spreading particles having a particle diameter equal to or smaller than that of the raw material particles and cover the entire resin on the surface of the substrate in order to minimize the exposure of the resin on the surface of the substrate. In addition, as the particles to be arranged on the surface of the substrate in order to make the surface of the substrate very smooth, small particles having a particle diameter on the order of submicron or smaller have been used. In sum, it has been conventionally practiced to employ a surface modification method in which particles having a small particle diameter on the order of submicron or smaller are spread without gaps to minimize the exposure of the resin on the surface of the substrate. It has been thought that the above method makes it possible to provide a structure having a very small crystallite size on the surface of a substrate containing a resin such as a resin plate.

On the other hand, the present inventors have obtained the knowledge that it is possible to form a relatively dense structure on the surface of a substrate containing a resin and to suppress defects such as the peeling of the structure by employing fillers having a relatively large particle diameter as the filler and setting the area filling factor of the fillers on the surface of the substrate within a predetermined range.

An object of the present invention is to provide a composite structure which is provided on the surface of a substrate containing a resin and which has a structure containing a brittle material as a main component.

Means for Solution of the Problems

To achieve the above object, the present invention provides a composite structure. A composite structure comprises a substrate and a structure which is provided on a surface of the substrate. The structure contains a brittle material as a main component. The structure is polycrystalline, and its average crystallite size is 100 nm or less. The substrate at least includes a first region including the substrate surface. The first region includes a matrix section which contains a first resin as a main component and fillers. A 90% particle diameter (D90) of the fillers is 1.0 μm or more and 60 μm or less. A filler area filling factor per unit area in the substrate surface is larger than 10% and 70% or less.

The present inventors have newly found the following. To be more specific, in the case of forming a structure using fillers and the like on a substrate surface difficult for structure formation, it becomes possible to form a structure and to suppress peeling and the like of the structure by setting the 90% particle diameter (D90) of the fillers to 1.0 μm or more and 60 μm or less and allowing the filler area filling factor per unit area in the substrate surface to be included within a predetermined value range.

Specifically, consider the case where the 90% particle diameter (D90) of the fillers used is smaller than 1.0 μm. When a structure is attempted to be formed on the substrate surface, a structure is formed but it is a green compact-like structure, failing to obtain a dense structure, or the fillers are detached from the substrate surface to cause peeling of the structure. On the other hand, if D90 is larger than 60 μm, it becomes difficult to control the filler area filling factor. In addition, if the filler area filling factor per unit area (hereinafter also referred to as the filling factor) is increased to more than 10%, an effect of improving the structure formation by adding fillers is displayed. On the other hand, also when the filling factor is larger than 70%, a structure is formed but it is a green compact-like structure, failing to obtain a dense structure, or the fillers are detached from the substrate surface to cause peeling of the structure.

Therefore, it becomes possible to form a relatively dense structure and to suppress defects such as the peeling of the structure by setting the 90% particle diameter (D90) of the fillers used as large as 1.0 μm or more and allowing the filler area filling factor to be included in a predetermined value range, that is, providing predetermined intervals between fillers. In addition, it is possible to achieve a desired filler area filling factor by setting the 90% particle diameter (D90) of the fillers as small as 60 μm or less.

In addition, in the composite structure according to the present invention, an average of distances between the fillers ($r_{av}$) in the substrate surface is preferably 0.5 μm or more and less than 5.0 μm and more preferably 0.5 μm or more and 2.0 μm or less.

In addition to the filling factor, it becomes possible to make the structure denser and to promote the formation of the structure by allowing the average of the distances between the fillers ($r_{av}$) to be included within a predetermined range, that is, allowing the fillers to sufficiently approach each other. On the other hand, if the fillers are too close, it becomes difficult to hold the fillers, resulting in detachment of the fillers from the substrate surface or defects such as failure to form a dense structure.

If the average of the distances between the fillers ($r_{av}$) in the substrate surface is 0.5 μm or more and less than 5.0 μm and more preferably 0.5 μm or more and 2.0 μm or less, it becomes possible to suppress the above defects and to obtain a good composite structure.

In addition, in the composite structure according to the present invention, the filler area filling factor per unit area in the substrate surface is preferably 25%.

If the filler area filling factor is increased to 25% or higher, it becomes possible to make the structure denser.

In addition, in the composite structure according to the present invention, the surface roughness of the substrate surface (Ra1) preferably larger than 0.1 μm, more preferably larger than 0.2 μm, and further preferably larger than 0.25 μm. In addition, surface roughness of the substrate surface (Ra1) is preferably less than 5 μm, more preferably less than 1 μm, and further preferably less than 0.5 μm.

The present invention provides new knowledge that, if the surface roughness of the substrate (Ra1) is too small, the structure to be provided thereon does not become sufficiently dense. In addition, if the surface roughness of the substrate (Ra1) is too large, it is difficult to form a structure by the AD method. If the surface roughness of the substrate (Ra1) is larger than 0.1 μm, more preferably larger than 0.2 μm, and further preferably larger than 0.25 μm or less than 5 μm, more preferably less than 1 μm, and further preferably less than 0.5 μm, a denser structure can be provided thereon.

In addition, in the composite structure according to the present invention, DHV2 of the first resin constituting the matrix section of the first region is 40 or more or less than 7.

It is generally difficult to form a structure on a resin having DHV2 of 40 or more or less than 7 by, for example, the AD method or the like. However, even in the case of such a resin, it is possible to form a relatively dense structure and to suppress defects such as the peeling of the structure by arranging fillers having a predetermined average particle diameter with a filler area filling factor within a predetermined range. Note that the DHV2 is the dynamic hardness in consideration of the plastic deformation of the material, and its details are described later. Examples of resins having a DHV2 of 40 or more include polymethyl methacrylate (PMMA), epoxy, polypropylene (PP), polycarbonate (PC), polystyrene (PS), and glass epoxy. As an example of the value of DHV2, PMMA is 89, epoxy is 86, PP is 48, PC is 44, PS is 49, and glass epoxy is 48. Examples of resins having a DHV2 of less than 7 include urethane and styrene butadiene.

In addition, in the composite structure according to the present invention, DHV2 of the first resin constituting the matrix section of the first region may be 7 or more and less than 40. In the case of such a resin, it is possible to form a structure by the AD method even when the matrix section does not contain fillers. On the other hand, fillers having a predetermined average particle diameter are preferably arranged with a filler area filling factor within a predetermined range because the structure can be denser. Examples of resins having a DHV2 of less than 40 include acrylonitrile butadiene styrene copolymers (ABS), polyethylene terephthalate (PET), polytetrafluoroethylene (PTFE), and polyimide. As an example of the value of DHV2, ABS is 33, PET is 33, PTFE is 8, and polyimide is 10.

Note that the first resin constituting the matrix section of the first region preferably contains at least one resin component selected from the group consisting of polymethyl methacrylate (PMMA), epoxy, urethane, styrene butadiene, polypropylene (PP), polycarbonate (PC), polystyrene (PS), glass epoxy, acrylonitrile butadiene styrene copolymers (ABS), polyethylene terephthalate (PET), polytetrafluoroethylene (PTFE), and polyimide. Moreover, the first resin may contain more than one resin component.

Although it may be difficult to form a structure depending on the type of the first resin, it is possible to obtain a composite structure having a relatively dense structure and to suppress defects such as the peeling of the structure by providing a first region in which fillers having a predetermined average particle diameter are arranged with a filling factor within a predetermined range.

In addition, in the composite structure according to the present invention, the substrate can further include a second region other than the first region.

In addition, in the composite structure according to the present invention, the second region preferably contains a second resin as a main component. The second resin may be the same as or different from the first resin. The second resin may contain one resin component or more than one resin component.

In addition, in the composite structure according to the present invention, the second region may be porous.

If the first region is provided, it is possible to obtain a composite structure even when the second region is porous.

In addition, in the composite structure according to the present invention, a surface roughness (Ra) of a surface of the second region in contact with the first region is 0.3 µm or more, for example 0.5 µm or more, 1.0 µm or more, and 1.5 µm or more. In the case of forming a structure on the resin surface not containing fillers, the rate of film formation reduces when growth and peeling of the structure are repeated. Besides, film quality also reduces, making it difficult to obtain a composite structure provided with a dense structure. Moreover, it becomes impossible to form a structure if the surface roughness (Ra2) is 1.5 µm or more. Since the substrate has the first region in the present invention, it is possible to form a dense structure also on the second region having a surface roughness (Ra2) of 0.3 µM or more.

In addition, in the composite structure according to the present invention, when a direction from the substrate to the structure is defined as a Z-axis direction, a length of the structure in the Z-axis direction is preferably larger than 1 µm. If the length (thickness) of the structure in the Z-axis direction is larger than 1 µm, it is possible to sufficiently display the functions of the structure.

In addition, in the composite structure according to the present invention, the surface roughness of the surface of the structure (Ra3) is preferably less than 0.1 µm more preferably 0.05 µm or less. When the surface roughness of the structure is sufficiently small, it is possible to form a denser structure.

Advantageous Effects of Invention

The present invention makes it possible to provide a composite structure which is provided with a structure containing a brittle material as a main component on the surface of a substrate containing a resin.

DESCRIPTION OF EMBODIMENTS

Description is provided for embodiments of the present invention with reference to the drawings.

Figure 1A:
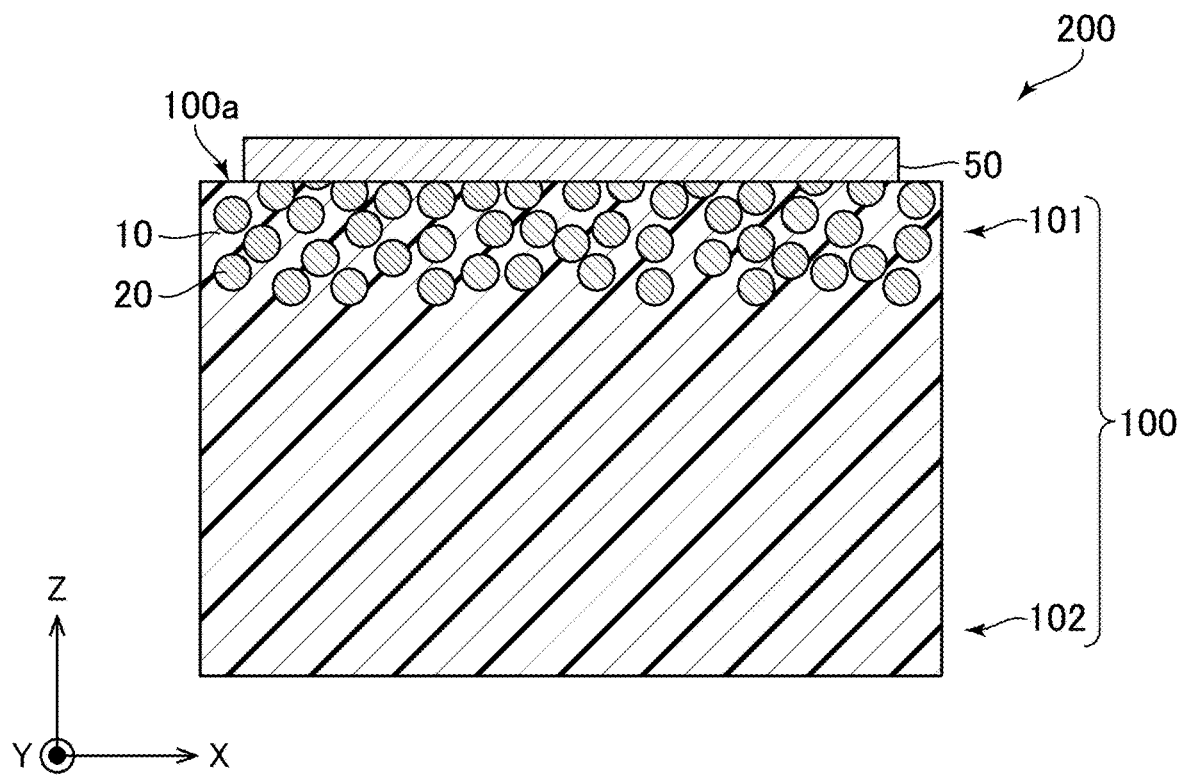
FIG. 1A and FIG. 1B are schematic cross-sectional views illustrating a configuration of a composite structure according to the present invention.
Figure 1B:
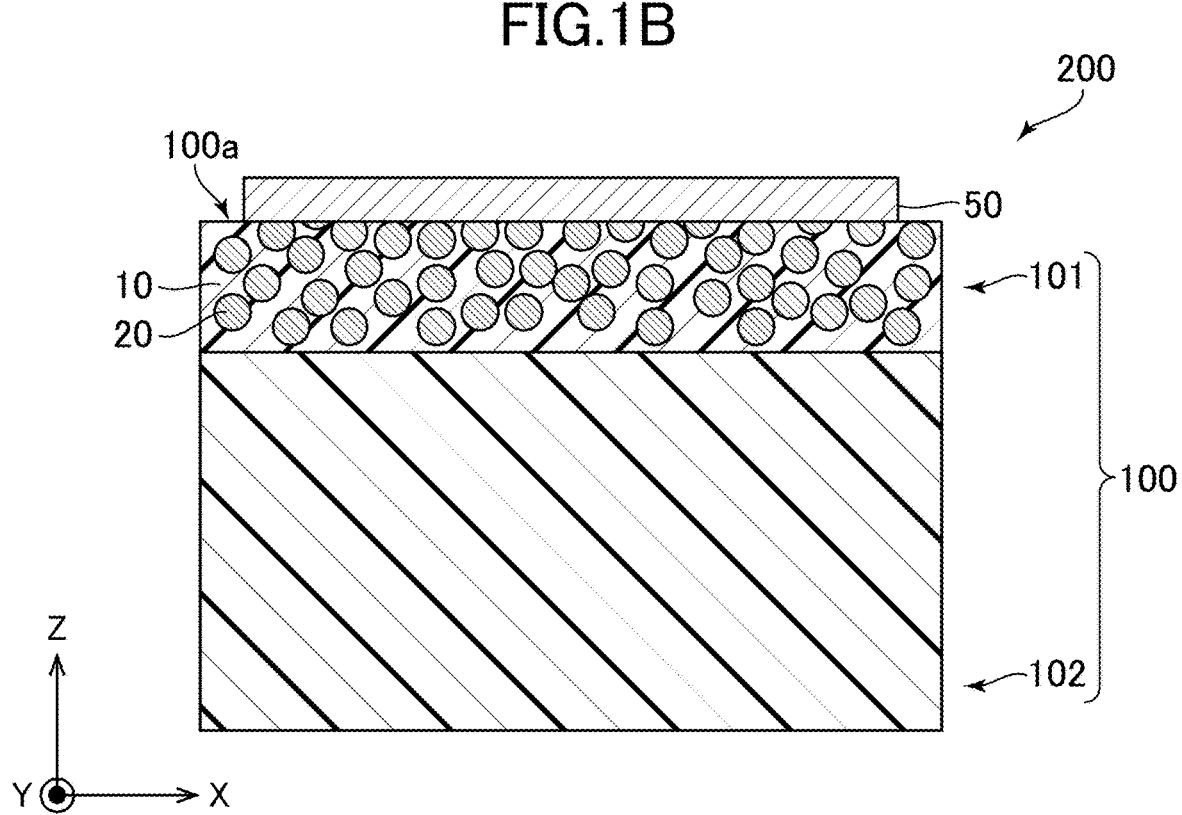

FIG. 1A and FIG. 1B are each a schematic cross-sectional view illustrating the configuration of the composite structure according to the present invention.

As illustrated in FIG. 1A and FIG. 1B, a composite structure 200 according to the present invention includes a substrate 100 and a structure 50. In this example, the substrate 100 includes a first region 101 and a second region 102. The first region 101 includes a substrate surface 100a.

In the present specification, the direction from the substrate 100 to the structure 50 (lamination direction) is defined as the Z-axis direction. Two directions perpendicular to the Z-axis direction are defined as the X-axis direction and the Y-axis direction, respectively.

In the composite structure 200, the first region 101 is arranged between the second region 102 and the structure 50 in the Z-axis direction. Note that the substrate 100 may include another region between the first region 101 and the second region 102, for example. In addition, the substrate 100 does not have to include the second region 102.

In the substrate 100, the first region 101 includes a matrix section 10 and fillers 20. The matrix section 10 contains a first resin as a main component. In the present specification, "as a main component" means a state where the component amounts to 50% or more or more preferably 70% or more of the relevant section. Preferably, the matrix section is made of the first resin.

In the first region 101, the fillers 20 are sporadically dispersed in the matrix section 10. Note that the second region 102 may include the fillers 20.

Figure 2A:
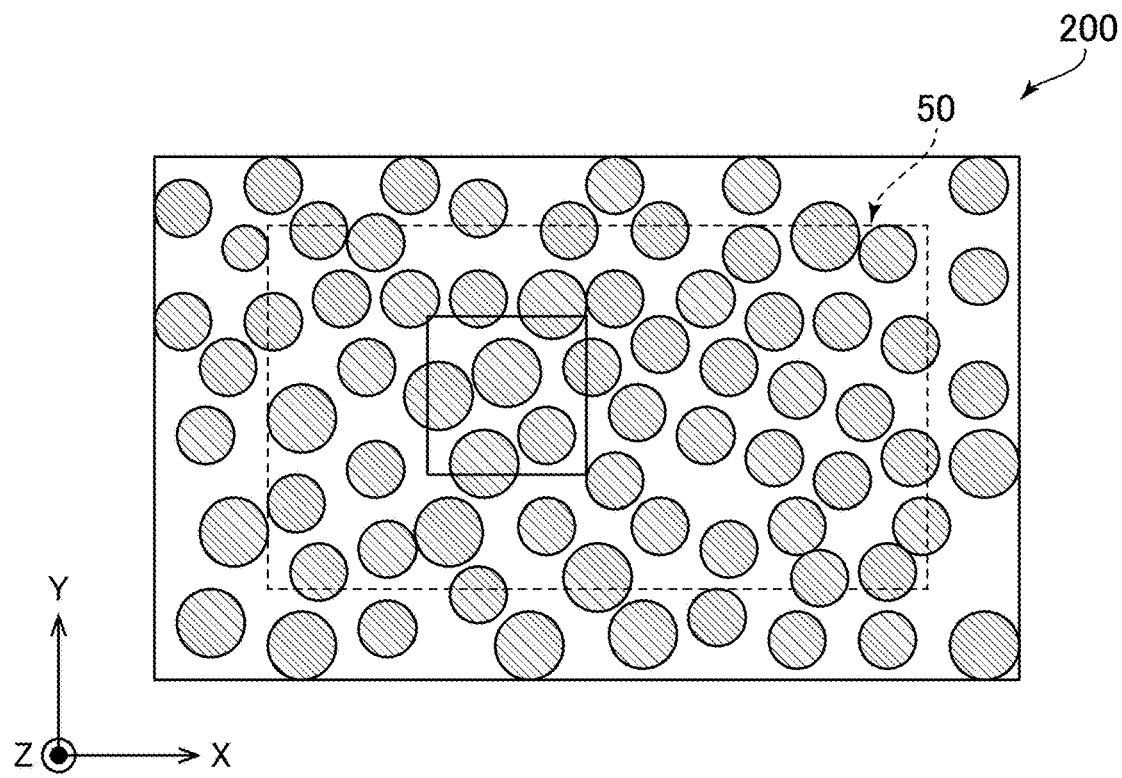
FIG. 2A and FIG. 2B are schematic plan views illustrating the configuration of the composite structure according to the present invention.
Figure 2B:
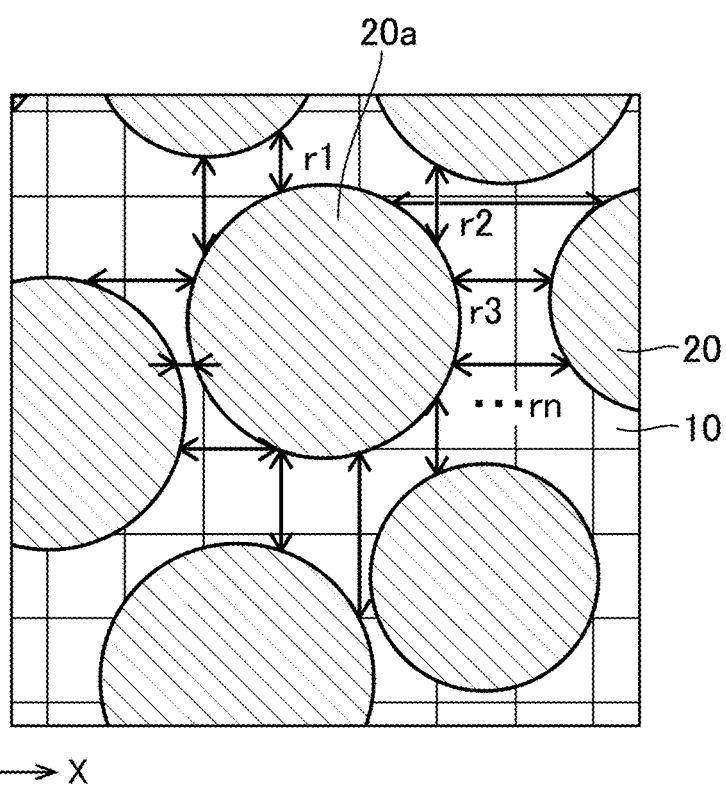

Description is further provided for the state of the fillers in the substrate surface 100a with reference to FIG. 2A and FIG. 2B.

FIG. 2A and FIG. 2B are each a schematic plan view illustrating the composite structure according to the present invention. FIG. 2A is a schematic plan view which is a projection of the composite structure 200 illustrated in FIG.

1A and FIG. 1B onto the X-Y plane. FIG. 2B is a schematic diagram enlarging the dotted line region in FIG. 2A.

Note that, in FIG. 2A and FIG. 2B, the structure 50 (long-chain line) is omitted.

(90% Particle Diameter D90 of Fillers)

In the composite structure 200 according to the present invention, the 90% particle diameter (D90) of the fillers 20 is 1.0 μm or more and 60 μm or less.

Here, as the "90% particle diameter (D90)", it is possible to use, for example, a particle diameter at which the relative particle amount becomes 90% in the particle size distribution curve obtained by wet laser diffraction method. The 90% particle diameter (D90) can be measured using, for example, MT3000 manufactured by Microtrac.

Note that, if the structure 50 is formed on the entire substrate surface 100a in the composite structure 200, it is possible to obtain D90 by removing at least part of the structure 50 of the composite structure 200 to expose the substrate surface 100a.

Description is provided for the details on the method of calculating D90 of the fillers by removing part of the structure 50 of the composite structure 200 to expose the substrate surface 100a.

First, cross-sectional observation is carried out using SEM or the like to measure the thickness of the structure 50. Next, the structure is removed from the surface by the thickness thereof to expose the substrate surface 100a. The substrate surface thus exposed is observed. It is possible to appropriately change the observation magnification depending on the 90% particle diameter of the fillers. When the filler diameter is small, a scanning electron microscope (SEM) is used, for example, and the magnification is set to about 2500 times. The field of view is selected to include 50 or more and less than 500 fillers per unit area. If the filler diameter is large, a laser microscope may be used to obtain an image. Also in this case, the field of view is similarly selected so as to include 50 or more and less than 500 fillers per unit area. For the obtained image, the fillers and the matrix section are binarized and separated using image processing software (winroof) to obtain the circle equivalent diameter of each filler. This is carried out for at least 5 fields of view, and after measuring at least 500 or more filler diameters, a 90% particle diameter in number distribution is obtained. D90 is calculated by multiplying the obtained numerical value by 1.74 as the coefficient of the intercept method.

If the substrate surface 100a includes a region where the structure 50 is not formed, D90 is similarly calculated from an image obtained by using SEM or a laser microscope as described above.

Next, description is provided for the method of removing the structure 50.

Although the structure 50 can be removed by any method, consideration is required so that the fillers are not detached. For example, the structure 50 may be gradually removed by grinding.

Alternatively, if the structure 50 is chemically dissolvable, only the structure 50 may be chemically dissolved to expose the substrate surface 100a. For example, when the structure 50 is yttria, it is possible to remove the structure using dilute hydrochloric acid. When the structure 50 is alumina or zirconia, it is possible to remove the structure using hydrofluoric acid or the like.

Note that D90 may be obtained by using an X-ray CT apparatus to obtain an image of the substrate surface 100a instead of removing the structure 50 in the composite structure 200 and using the same method as the method for the images obtained with SEM or a laser microscope.

Consider the case where the 90% particle diameter of the fillers 20 is smaller than 1.0 μm. When a structure is attempted to be formed on the substrate surface, a structure is formed but it is a green compact-like structure or the fillers are detached from the substrate surface to cause peeling of the structure. If the 90% particle diameter of the fillers 20 is set as large as 1.0 μm or more and the filler filling factor to be described later is set within a predetermined range, it is possible to form a relatively dense structure and to suppress defects such as the peeling of the structure.

If the 90% particle diameter (D90) of the fillers 20 is larger than 60 μm, the proportion of coarse and large particles in the fillers increases. Thus, it may become difficult to control the filling factor to be described later, or the surface roughness (Ra1) of the substrate 100 may become markedly large. If the average particle diameter of the filler is reduced to 60 μm or less, it becomes easy to achieve a desired filling factor by controlling the filling factor. In addition, it is possible to appropriately reduce the surface roughness (Ra1) of the substrate 100.

The 90% particle diameter (D90) of the fillers 20 is, for example, 50 μm or less, more preferably 45 μm or less, and further preferably 10 μm or less. In addition, the 90% particle diameter (D90) of the fillers 20 is more preferably 3 μm or more and further preferably 5 μm or more.

(Filler Area Filling Factor)

In the present specification, the filler area filling factor (filling factor) per unit area is the area proportion per unit area occupied by the fillers in the substrate surface 100a.

The filler area filling factor per unit area is calculated as follows. If the substrate surface 100a in the composite structure 200 has a region where the structure 50 is not formed, the substrate surface 100a is observed with a scanning electron microscope (SEM). If the 90% particle diameter (D90) of the fillers 20 is 5 to 10 μm, for example, measurement is carried out with SEM at a magnification of 2500 times. For the image, the fillers 20 and the matrix section 10 are binarized and separated using image processing software (winroof or the like) to calculate the area factor calculated by statistical processing. Regarding this field of view, the average for measurement of 5 fields of view is defined as the filler area filling factor. The observation magnification may be appropriately selected so as to ensure a field of view including at least 50 to 500 fillers 20 in the measurement field of view as a unit area and can be changed depending on the size of the filler. For example, if the 90% particle diameter (D90) of the fillers is as large as 45 μm or more, a laser microscope may be used in place of SEM.

If the structure 50 is formed on the entire substrate surface 100a of the composite structure 200, it is preferable to carry out observation in a state where at least part of the structure 50 of the composite structure 200 is removed. It is possible to use the above-described method to remove the structure 50. Also, calculation is possible by using an X-ray CT apparatus to observe the substrate surface. Note that although description is provided in detail in the production method described later, the filling factor is preferably measured after the polishing of the substrate surface 100a.

In the composite structure 200, the filler area filling factor (filling factor) per unit area in the substrate surface 100a is more than 10% and 70% or less. More preferably, the filling factor is 25% or more. Here, the substrate surface 100a is a surface parallel to a plane perpendicular to the Z-axis direction (X-Y plane).

If the filling factor is as small as 10% or less, it is impossible to fully enjoy the effect of adding the fillers. Consider the case, for example, where it is difficult to form a structure in the first resin constituting the matrix section 10. If the area filling factor of the fillers 20 is as small as 10% or less, it is difficult to obtain the effect of improving the structure formation by addition of the fillers 20. In addition, even when it is possible to form a structure on the first resin constituting the matrix section 10, it is difficult to make the structure denser. If the filling factor is set to more than 10% and more preferably to 25% or more, it is possible to more reliably obtain the effect of adding the fillers 20. On the other hand, if the filling factor is more than 70%, a structure is formed but it is a green compact-like structure or the fillers are detached from the substrate surface to cause peeling of the structure, or there is a possibility that the structure is not sufficiently dense.

If the filler area filling factor is set within the range of more than 10% to 70% or less, it is possible to obtain a relatively dense structure and to suppress defects such as the peeling of the structure.

(Inter-Filler Distance $r_{av}$)

In the present specification, the average of the distances between the fillers 20 ($r_{av}$) refers to the average value of the distances between the particles along the sides of the grids formed by dividing the substrate surface 100a into grid shapes. An area including at least 50 fillers 20 in the measurement field of view is defined as the unit area.

Specifically, the substrate surface 100a is observed with a scanning electron microscope (SEM). If the 90% particle diameter (D90) of the fillers 20 is 5 to 10 μm, for example, measurement is carried out with SEM at a magnification of 2500 times. For the image, the fillers 20 and the matrix section 10 are binarized and separated using image processing software (winroof or the like) per unit area. Then, the luminance change on the lines drawn on the binarized image is automatically detected, and at least 500 or more measurements are carried out in a grid pattern on the inter-peak distances for obtaining the length between the change points. Here, the number of grids per unit area is 15 lines or more in each of the vertical and horizontal directions. The average value of these distances is defined as the average of the distances between the fillers 20 ($r_{av}$).

For example, as illustrated in FIG. 2B, 15 lines or more of grids in vertical and horizontal directions per unit area are drawn (the figure illustrates only a part thereof). The distance between a filler 20a and the adjacent filler along the side of the grid is measured in such a manner that $r_1$, $r_2$, $r_3$, . . . $r_n$ until $r_{500}$. This is carried out for all fillers included in the unit area to calculate their average.

The observation magnification may be appropriately selected so as to ensure a unit area including at least 50 fillers 20 in the measurement field of view and can be changed depending on the size of the filler. For example, if the 90% particle diameter (D90) of the fillers is as large as 45 μm or more, a laser microscope may be used in place of SEM.

If the structure 50 is formed on the entire substrate surface 100a of the composite structure 200, it is preferable to carry out observation in a state where at least part of the structure 50 of the composite structure 200 is removed. Also, calculation is possible by using an X-ray CT apparatus to observe the substrate surface. Note that although description is provided in detail in the production method described later, the inter-filler distance is preferably measured after the polishing of the substrate surface.

In the composite structure 200, the average of the distances between the fillers 20 ($r_{av}$) in the substrate surface 100a is preferably 0.5 μm or more and less than 5.0 μm and more preferably 0.5 μm or more and 2.0 μm or less. Here, the substrate surface 100a is a surface parallel to a plane perpendicular to the Z-axis direction (X-Y plane).

If the average of the distances between the fillers 20 ($r_{av}$) is 5.0 μm or more, it is impossible to fully enjoy the effect of adding the fillers 20. Consider the case, for example, where it is difficult to form a structure in the first resin constituting the matrix section 10. If the average of the distances between the fillers ($r_{av}$) is as large as 5.0 μm or more, it is difficult to obtain the effect of improving the structure formation. On the other hand, if the inter-filler distance is smaller than 0.5 μm, a structure is formed but it is a green compact-like structure or the fillers are detached from the substrate due to e.g. the impact by the AD method to cause peeling of the structure, or there is a possibility that the structure is not sufficiently dense.

If the average of the distances between the fillers ($r_{av}$) is set within a range of 0.5 μm or more and less than 5.0 μm and more preferably 0.5 μm or more and 2.0 μm or less, it is possible to obtain a relatively dense structure and to suppress defects such as the peeling of the structure.

(Surface Roughness Ra1 of Substrate Surface)

For example, in the composite structure 200 according to the present invention, surface roughness of the substrate surface 100a (Ra1) is preferably less than 5 μm, more preferably less than 1 μm, and further preferably less than 0.5 μm. Here, the surface roughness (Ra1) can be calculated in accordance with JIS B 0601.

If the surface roughness of the substrate (Ra1) is large, it is difficult to form a structure by the AD method. When the surface roughness of the substrate (Ra1) is made larger than 0.1 μm, more preferably larger than 0.2 μm, and further preferably larger than 0.25 μm and/or smaller than 5 μm, more preferably less than 1 μm, and further preferably less than about 0.5 μm, it is possible to arrange the dense structure thereon.

(Filler Material)

Usable fillers 20 in the present invention include inorganic material fillers and metal material fillers. Examples of the inorganic material fillers include alumina fillers, glass beads, and silica fillers. Examples of the metal material fillers include copper powder, silver powder, iron powder, and stainless steel powder. In addition, a resin filler may be used as the filler 20. In the case of a resin filler, Young's modulus measured using a nanoindenter is preferably 5 GPa or more. Examples of such resin filler include polyimide resin fillers and polyether ether ketone resin (PEEK) fillers.

Note that a filler may be appropriately selected so as to impart functionality to the substrate surface 100a. A filler of, for example, alumina, zirconia, or the like can be used to increase the strength. In addition, a resin filler having higher strength than the matrix section may be used.

It is possible to use fillers of, for example, AlN, BN, alumina, and the like in order to enhance thermal conductivity. It is possible to use fillers of, for example, Ni, Al, Cu, and Ag in order to enhance conductivity.

(Filler Shape)

The shape of the filler 20 may be any shape. In addition to a spherical shape, the shape may be a sharp shape like crushed powder.

(Matrix Section 10)

In the present invention, it is possible to use any resin such as a thermosetting resin, a thermoplastic resin, and a photocurable resin as the first resin constituting the matrix section 10. It is particularly preferable that the first resin be one that makes it difficult for the fillers 20 to detach.

The DHV2 of the first resin constituting the matrix section 10 is preferably 40 or more. Here, the DHV2 is the dynamic hardness in consideration of the plastic deformation of the material. It is possible to measure the DHV2 using, for example, a nanoindenter (ENT-2100 manufactured by Elionix Inc.).

Examples of the usable first resin include resins containing epoxy, polymethyl methacrylate (PMMA), polypropylene (PP), polycarbonate (PC), polystyrene (PS), and glass epoxy. In addition, as the first resin, it is possible to use urethane and styrene butadiene as well as acrylonitrile butadiene styrene copolymers (ABS), polyethylene terephthalate (PET), polytetrafluoroethylene (PTFE), polyimide, and the like.

Description is provided for the composite structure 200 with reference to FIG. 1A and FIG. 1B.

(Substrate 100)

In the substrate 100, the second region 102 can be composed of any material.

For example, the second region 102 may contain the second resin as a main component. As illustrated in FIG. 1A, the first resin in the first region 101 and the second resin in the second region 102 may be composed of the same resin. As illustrated in FIG. 1B, they may be composed of different resins. The first resin may contain one or more resin components. The second resin may contain one or more resin components. In addition, although it is essential that the fillers 20 exist in the first region 101 including the substrate surface 100a, the second region 102 may or may not contain the fillers 20.

As illustrated in FIG. 1B, the second region 102 may be composed of other than resin, for example ceramics or metal. In the case where, for example, it is difficult to form a structure by the AD method or the like because the second region 102 is composed of ceramics or metal and thus has a waviness on its surface or has a rough surface roughness, a composite structure may be obtained by providing the first region 101 according to the present invention.

In the substrate 100, the second region 102 may be porous. For example, in the case where second region 102 is porous, it may be difficult to provide a structure thereon by the AD method or the like. In this case, the composite structure 200 may be obtained by providing the first region 101.

For example, the second region 102 may be alumite, thermal spraying film, or the like. The second region 102 may be a fiber reinforced plastic such as a CFRP. If the first region 101 is provided, it is possible to obtain the composite structure 200 regardless of the surface state where the second region 102 is porous, the surface roughness is rough or wavy, and the like.

(Structure 50)

The structure 50 contains a brittle material as a main component. In the present specification, "as a main component" means as described above a state where the component amounts to 50% or more or more preferably 70% or more of the relevant section. Also, the structure 50 may be composed of a brittle material.

Here, examples of the brittle material include ceramics and semimetals. More specific examples include oxides such as aluminum oxide, titanium oxide, zinc oxide, tin oxide, iron oxide, zirconium oxide, yttrium oxide, chromium oxide, hafnium oxide, beryllium oxide, magnesium oxide, and silicon oxide, carbides such as diamond, boron carbide, silicon carbide, titanium carbide, zirconium carbide, vanadium carbide, niobium carbide, chromium carbide, tungsten carbide, molybdenum carbide, and tantalum carbide, nitrides such as boron nitride, titanium nitride, aluminum nitride, silicon nitride, niobium nitride, and tantalum nitride, borides such as boron, aluminum boride, silicon boride, titanium boride, zirconium boride, vanadium boride, niobium boride, tantalum boride, chromium boride, molybdenum boride, and tungsten boride, fluorides such as calcium fluoride, magnesium fluoride, yttrium fluoride, and aluminum fluoride, oxyfluorides such as aluminum oxyfluoride and yttrium oxyfluoride, mixtures thereof, or solid solutions of multinary system, piezoelectric and pyroelectric ceramics such as barium titanate, lead titanate, lithium titanate, strontium titanate, aluminum titanate, PZT, and PLZT, high toughness ceramics such as SiAlONs and cermets, biocompatible ceramics such as hydroxyapatite and calcium phosphate, silicon, germanium, and semimetal substances to which various doping substances such as phosphorus are added to these, and semiconductor compounds such as gallium arsenide, indium arsenic, and cadmium sulfide.

The structure 50 is polycrystalline and has an average crystallite size of 100 nm or less.

Here, polycrystalline means that the structure 50 contains a plurality of crystallites. The average crystallite size can be obtained by, for example, the X-ray diffraction method.

It is possible to use, for example, "X'Pert PRO (manufactured by Panalytical Ltd.)" as the X-ray diffractometer (XRD). As a measurement example, it is possible to set a tube voltage of 45 kV, a tube current of 40 mA, and a scanning step of 0.033°, for example. The following Scherrer equation is used to calculate the crystallite size $$D = K\lambda/((\beta \cos \theta),$$

where D is the crystallite size, β is the half-width (radian (rad)), θ is the Bragg angle (rad), and λ is the wavelength of the X-ray used for the measurement. In the Scherrer equation, β is calculated by β=(βobs−βstd), where βobs is the half-width of the X-ray diffraction peak for the measurement sample, and βstd is the half-width of the X-ray diffraction peak for the standard sample. For example, 0.94 is used as the value of K. It is possible to appropriately select the X-ray diffraction peak usable for calculating the crystallite size depending on the material constituting the structure 50.

Note that the crystallite size may be calculated with images from, for example, TEM observation. As the average crystallite size, it is possible to use, for example, the average value of the equivalent circle diameters of the crystallites.

In the structure 50, the average crystallite size is 100 nm or less. The average crystallite size is preferably 50 nm or less and more preferably 30 nm or less. If the average crystallite size is sufficiently small, a dense structure can be obtained. For this reason, it is possible to use the composite structure 200 for applications requiring high mechanical characteristics such as abrasion resistance and high hardness.

Here, one specific method of forming the structure 50 is the aerosol deposition method. The aerosol deposition method includes spraying aerosol, obtained by dispersing fine particles of a raw material such as a brittle material in a gas, through a nozzle toward a substrate and causing the raw material fine particles to collide with the substrate made of, for example, metal, glass, ceramics, or plastic. The impact of this collision causes deformation and crushing in the fine particles, followed by bonding to directly form on the substrate a structure composed of constituent material of the raw material fine particles. In particular, it is possible to form a structure at normal temperature which does not require a heating means, and it is possible to obtain a structure having mechanical strength almost equal to that of a sintered body.

Figure 3:
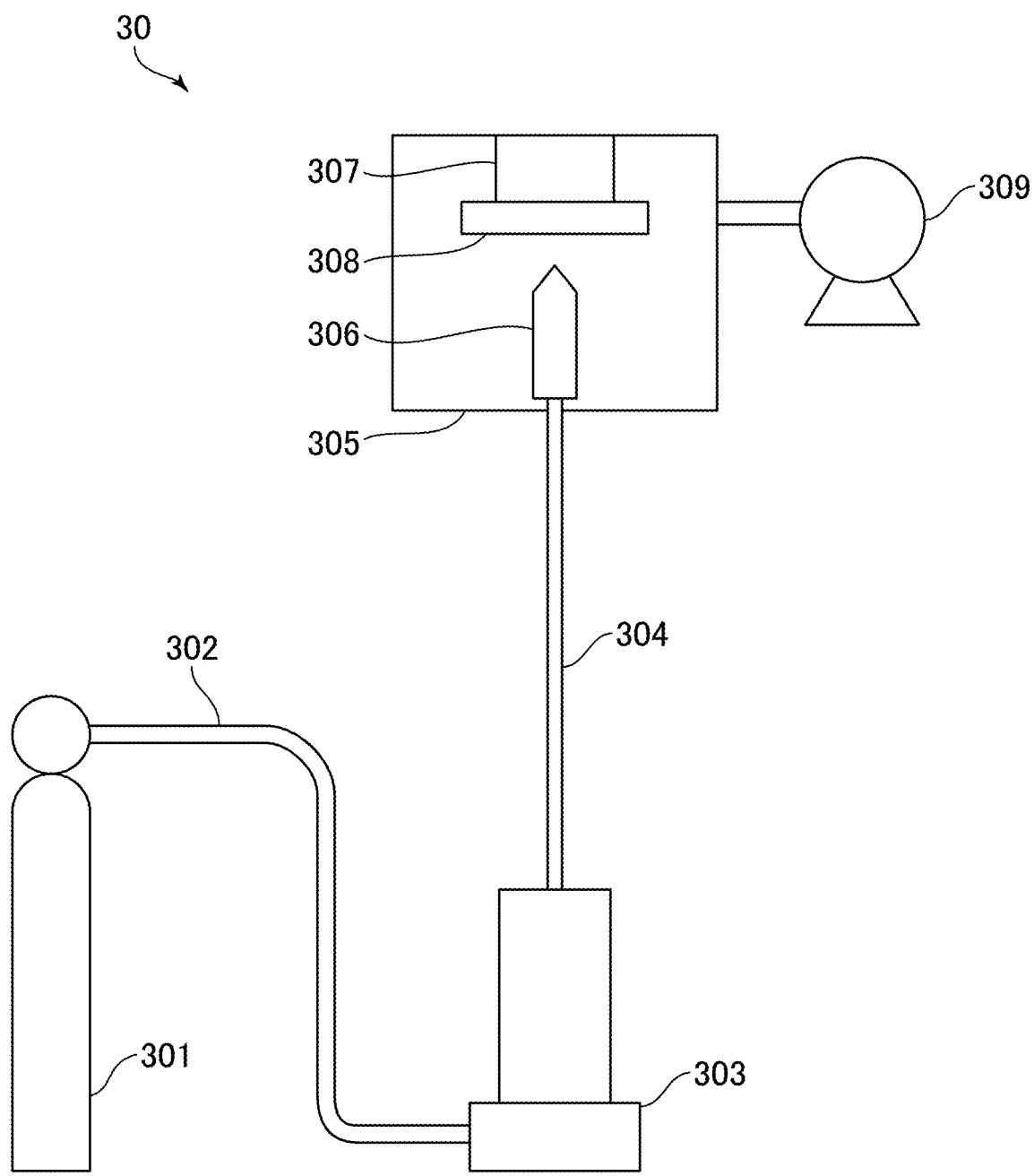
FIG. 3 is a schematic diagram illustrating a configuration of an apparatus used in an aerosol deposition method.

FIG. 3 is a schematic diagram illustrating the configuration of the apparatus used in the aerosol deposition method.

As illustrated in FIG. 3, the apparatus 30 used in the aerosol deposition method includes an aerosol generator 303 for generating an aerosol obtained by mixing raw material fine particles and gas and a nozzle 306 for injecting the aerosol toward the substrate. The nozzle 306 is connected to the aerosol generator 303 by, for example, a pipe 304. In addition, the position control means 307 relatively moves and swings the nozzle 306 and the substrate fixed to the stage 308, making it possible to form a structure having a desired area and a desired thickness. In the case of forming a structure under reduced pressure, a chamber 305 and a vacuum pump 309 may be provided. Moreover, the aerosol generator 303 and the gas generation source 301 may be connected by a pipe 302.

The formation temperature of the aerosol deposition method is normal temperature, and it is possible to form a structure at a temperature sufficiently lower than the melting point of the fine particle material, that is, several hundred degrees Celsius or less, preferably 50° C. or less, and more preferably normal temperature. Thus, there are various kinds of selectable substrates, and they can be a composite structure containing a low-melting-point metal or a resin material.

Consider the case of using fine particles of crystalline brittle material as a raw material in the structure 50 formed by the AD method. The brittle material portion of the structure has a crystallite size smaller than that of the raw material fine particles. The average crystallite size of the structure formed by the AD method is, for example, 100 nm or less and more preferably 50 nm or less. In many cases, the crystal has substantially no crystal orientation.

The structure 50 formed by this method is clearly different from a so-called green compact which is in a state where its form is maintained by physical adhesion only because the fine particles are packed by pressure. It is possible to determine the difference from the green compact by, for example, the hardness of the structure 50. For example, determination may be made as a green compact if the Vickers hardness is as small as HV 50 or less, and determination may be made as a structure if the Vickers hardness is larger than HV 50. Note that, regarding the Vickers hardness, conversion into Vickers hardness is possible after measuring the hardness for a depth of about 150 nm to 500 nm from the surface of the structure by use of, for example, a nanoindenter (ENT-2100 manufactured by Elionix Inc.).

In the AD method, it is possible to determine whether or not the brittle material fine particles are crushed or deformed by measuring the crystallite size of the brittle material fine particles used as a raw material and of the formed brittle material structure by the X-ray diffraction method. That is, it is possible to consider that crushing or the like has taken place if the crystallite size of the structure is smaller than the crystallite size of the raw material.

Depending on the application, the brittle material fine particles may be combined with resin fine particles, metal fine particles, or the like as the raw material fine particles used in the AD method.

(Production Method)

Next, description is provided for the method of forming the composite structure 200.

First, description is provided for the method of forming the substrate 100.

The first resin material as the matrix section 10 and a solvent such as acetone are mixed in a stirring vessel and sufficiently mixed with a stirring tool such as a stirrer to completely dissolve the first resin material in the solvent. To this solution, a predetermined amount of filler is added, followed by further sufficient stirring to obtain a filler resin mixture solution. This mixture solution is dropped onto the support (second region) and cured. Here, if the first resin material constituting the matrix section 10 is a thermosetting resin, the first resin material is sufficiently heated with an oven or the like. If the first resin constituting the matrix section 10 is a photocurable resin, light irradiation is carried out with, for example, an ultraviolet curing apparatus or the like. The support (second region) may be composed of the second resin having the same component as that of the first resin constituting the matrix section, or may be composed of the second resin having a component different from that of the first resin constituting the matrix section. In addition, the support (second region) may be composed of ceramics, metal, or the like. Additionally, without using the above-described filler resin mixture solution, one may apply the first resin to the support (second region) and uniformly arrange the fillers thereon, followed by sufficient drying to cure the first resin. The drying temperature can be normal temperature to about 150° C.

It is preferable to obtain the substrate 100 by curing the first resin followed by polishing of the surface thereof. Note that, if the composite structure 200 does not include the second region, the support may be removed after the resin is cured.

Next, a structure is formed on the substrate 100.

The structure can be formed by a known method. For example, it is possible to form a structure by spraying fine particles at high speed onto the substrate surface 100a.

This makes it possible to obtain the composite structure 200.

EXAMPLES

Samples 1 to 37

(Preparation of Substrate 100)

A polymethyl methacrylate resin (PMMA) plate of 20 mm square and 10 mm thick was prepared as a support (second region). The plate was washed sequentially with ion exchange water and ethanol in order to remove stains on the surface. Note that polymethyl methacrylate plates are highly versatile and used for various applications, but they are known for the difficulty in forming a structure by, for example, the AD method. In samples 1 to 37, this polymethyl methacrylate plate was used as the second region 102 of the substrate 100.

Next, the first region 101 was prepared.

Introduced into a 50 ml stirring vessel were acetone and an epoxy resin being a thermosetting resin as the first resin constituting the matrix section 10, followed by stirring for 5 minutes with a stirrer to completely dissolve the epoxy resin in acetone. A predetermined amount of each type of filler 20 was further added to the epoxy solution, followed by further stirring with a stirrer for 5 minutes or more to prepare a filler resin mixture solution 1.

In addition, in the example where an acrylic resin was used as the first resin similarly constituting the matrix section, ethanol and an acrylic resin of photocurable resin were added to a 50 ml stirring vessel, followed by stirring with a stirrer for 5 minutes or more to completely dissolve the acrylic resin in ethanol. After that, IRGACURE 184 was added as a curing agent, followed by stirring with a stirrer.

A filler was further added, followed by stirring for 5 minutes or more to obtain a filler resin mixture solution 2.

Next, the first region 101 was formed on the second region 102.

When an epoxy resin being a thermosetting resin was used as the first resin constituting the matrix section 10, the filler resin mixture solution 1 was dropped onto the second region with washed surface, followed by thermal curing at 120° C. for 2 hours or more in an oven. In addition, when a photocurable acrylic resin was used as the first resin constituting the matrix section 10, the filler resin mixture solution 2 was similarly dropped onto the second region, followed by curing for 10 seconds with an ultraviolet curing apparatus. Moreover, when a urethane-based resin was used as the first resin constituting the matrix section 10, the urethane-based resin was applied on the second region and fillers were uniformly arranged thereon, followed by sufficient drying at room temperature for curing. Furthermore, when a styrene butadiene-based resin was used as the first resin constituting the matrix section 10, the styrene butadiene-based resin was similarly applied on the second region and fillers were uniformly arranged thereon, followed by sufficient drying at room temperature for curing.

What is more, when an epoxy resin or an acrylic resin was used as the first resin constituting the matrix section 10 among these cured bodies, the cured body was polished using #500, #3600, and #8000 polishing paper to obtain the substrate 100. In addition, when a urethane-based resin or a styrene butadiene-based resin was used as the first resin constituting the matrix section 10, the surface was polished using a paste containing a polisher to obtain the substrate 100. Note that the thickness of the first region 101 was 100 to 500 µm.

Samples 38 and 39

Samples 38 and 39 were obtained in the same method as that for sample 11 except that the second region 102 employed was an alumite plate having an anodic oxide film on the aluminum surface or a carbon fiber reinforced plastic plate (CFRP) instead of a polymethyl methacrylate resin (PMMA) plate.

Regarding samples 1 to 39, Table 1 shows the details of the first resin and the fillers constituting the matrix section. All samples using the filler resin mixture solution 1 or 2 as the first resin showed a DHV2 of 40 or more. In addition, all samples using the urethane-based resin or the styrene butadiene-based resin as the first resin showed a DHV2 of less than 7.

(Evaluation of Substrate 100)

For the obtained substrate 100, measurement was carried out on the 90% particle diameter (D90) of the fillers, the filler area filling factor, the average of the distances between the fillers ($r_{av}$), and the surface roughness (Ra1).

The 90% particle diameter (D90) of the fillers was measured by the following method.

For samples 3 to 30 and 35 to 39, a scanning electron microscope (SEM) was used to obtain images of the substrate surface 100a. The magnification was 2500 times. For samples 31 to 34, a laser microscope was used to obtain images. The field of view was selected to include 50 or more fillers per unit area. For the obtained image, the fillers and the matrix section were binarized and separated using image processing software (winroof) to obtain the circle equivalent diameter of each filler. This was carried out for 5 fields of view, and after measuring at least 500 or more filler diameters, a 90% particle diameter in number distribution was obtained. D90 was calculated by multiplying the obtained numerical value by 1.74 as the coefficient of the intercept method. Note that the value for sample 2 was set to the value of 90% particle diameter (D90) of the raw material because a good sample could not be obtained.

The filler area filling factor was measured by the following method. For samples 3 to 30 and 35 to 39, a scanning electron microscope (SEM) was used to obtain images of the substrate surface 100a. The magnification was 2500 times. For samples 31 to 34, a laser microscope was used to obtain images of the substrate surface 100a. The field of view was selected to include 50 or more fillers per unit area. For the obtained image, the fillers and the matrix section were binarized and separated using image processing software (winroof) to calculate the area factor calculated by statistical processing. Regarding this field of view, the average for measurement of 5 fields of view was defined as the filler area filling factor. Note that, for sample 2, it was impossible to obtain a good substrate surface by polishing and to measure the filler area filling factor.

The average of the distances between the fillers ($r_{av}$) was measured by the following method.

Figure 4A:
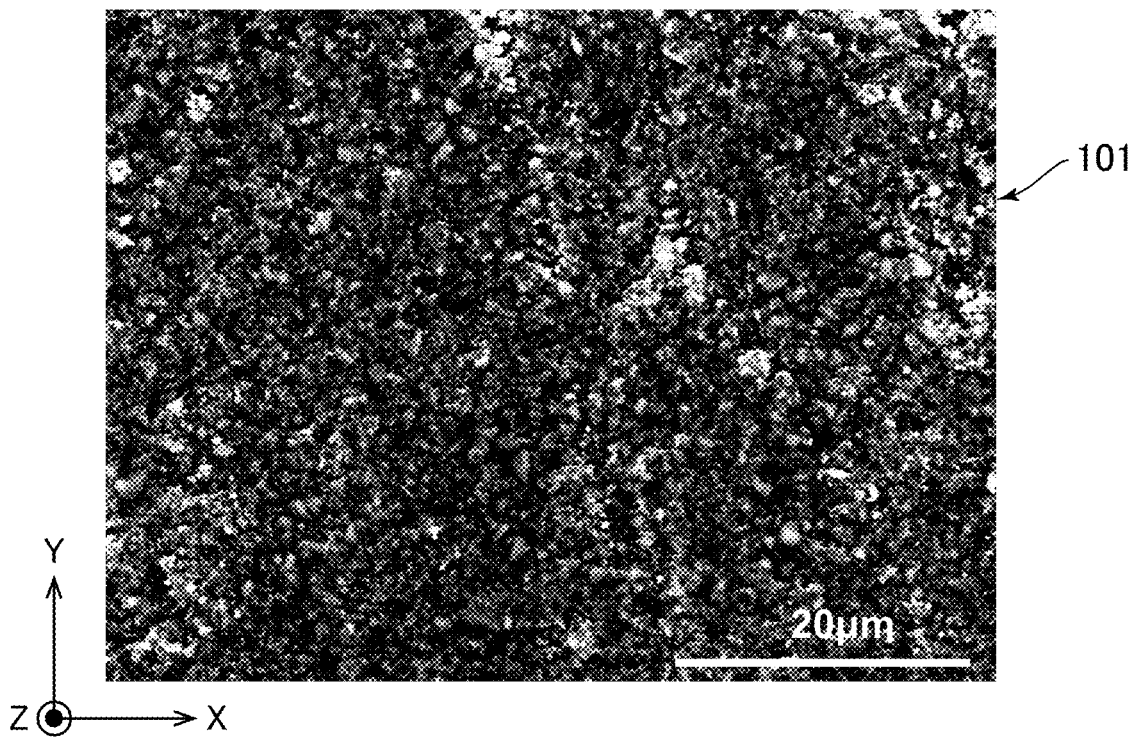
FIG. 4A and FIG. 4B are plan SEM images of a first region 101 according to the present invention.
Figure 4B:
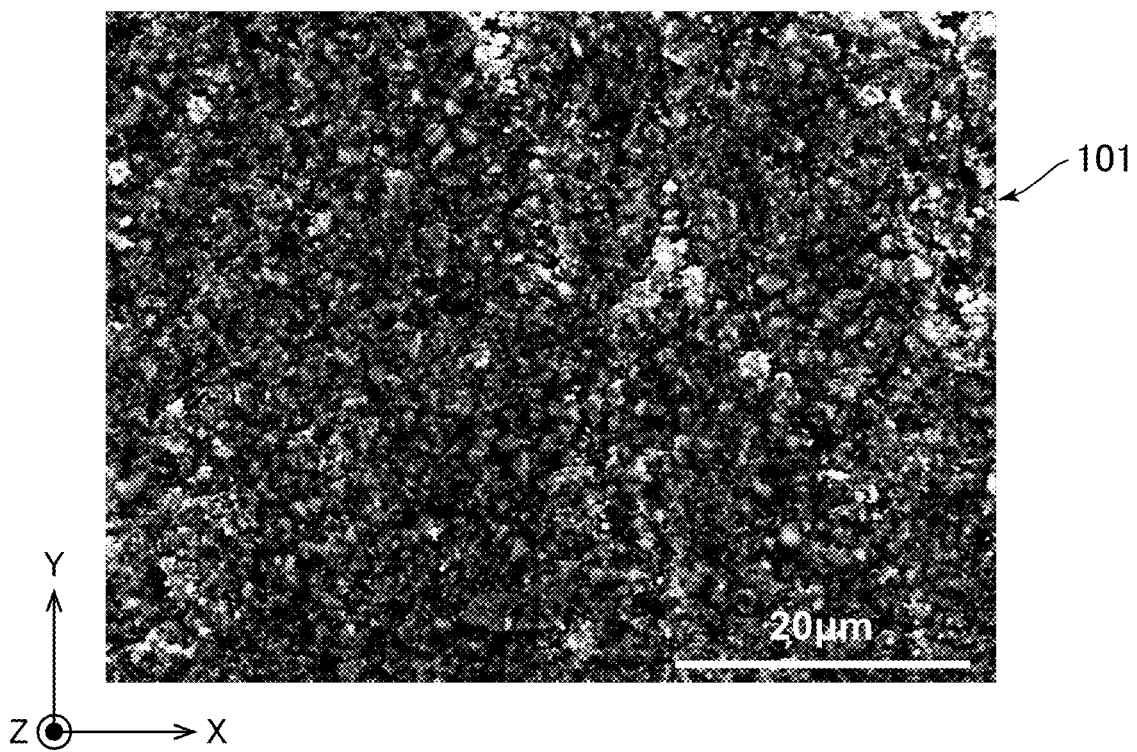
Figure 5A:
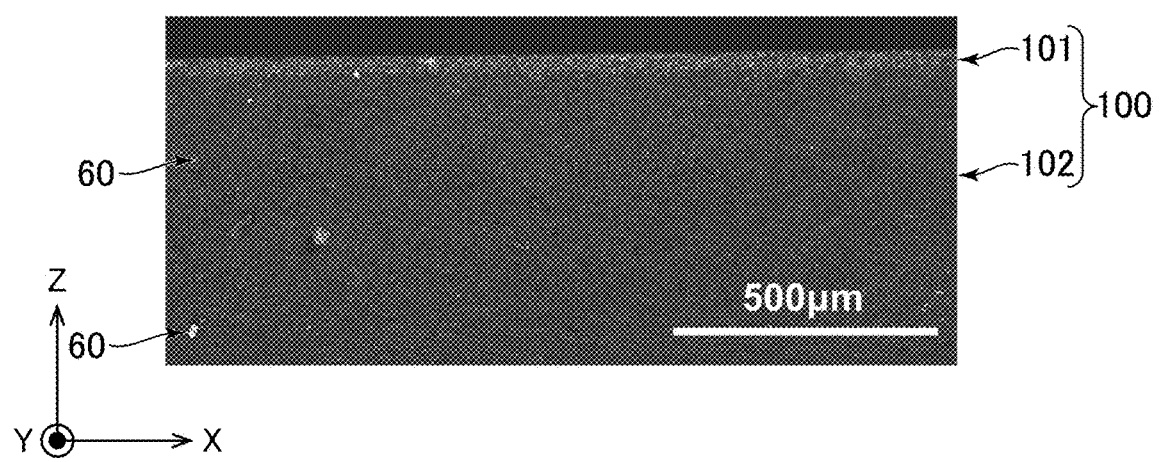
FIG. 5A and FIG. 5B are cross-sectional SEM images of a substrate 100 according to the present invention.
Figure 5B:
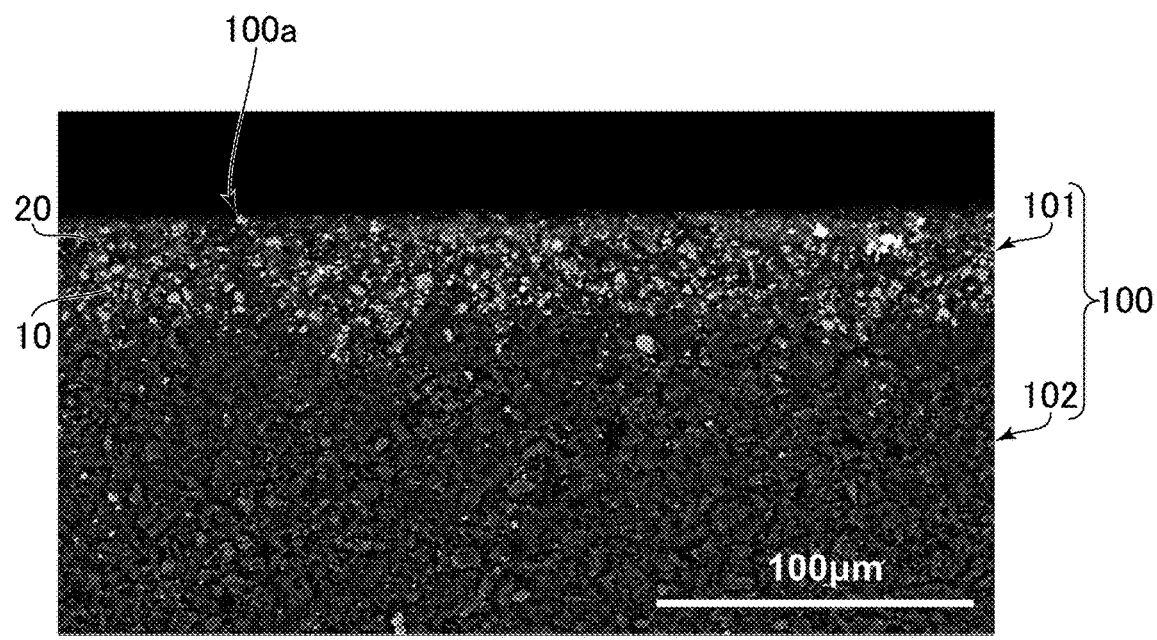

For samples 3 to 30 and 35 to 39, a scanning electron microscope (SEM) was used to obtain images of the substrate surface 100a. The magnification was 2500 times. For samples 31 to 34, a laser microscope was used to obtain images of the substrate surface 100a. The field of view was selected to include 50 or more fillers per unit area. Here, the number of grids per unit area was 15 lines or more in each of the vertical and horizontal directions. For the obtained image, the fillers and the matrix section were binarized and separated using image processing software (winroof) to automatically detect the luminance change on the lines drawn on the binarized image, and at least 500 or more measurements were carried out in a grid pattern on the inter-peak distances for obtaining the length between the change points. The average value of those distances was taken as the average of the distances between the fillers 20 ($r_{av}$). Note that, for sample 2, it was impossible to obtain a good substrate surface by polishing and to measure the average of the distances between the fillers ($r_{av}$). FIG. 4A and FIG. 4A illustrate plan SEM images for sample 8 and sample 11, respectively. In addition, FIG. 5A and FIG. 5A illustrate cross-sectional SEM images for sample 38. FIG. 5A and FIG. 5B have different magnifications. These SEM images make it possible to confirm that fillers with a relatively large particle size are sporadically dispersed.

The surface roughness of the substrate surface (Ra1) was calculated in accordance with JIS B 0601 using Surfcom 130A manufactured by Tokyo Seimitsu Co., Ltd. Note that the surface roughness of the matrix section 10 is shown for sample 1 with no added fillers. Note that, for sample 2, it was impossible to obtain a good substrate surface by polishing and to measure the surface roughness of the substrate Ra1.

For the substrate 100, Table 1 shows the 90% particle diameter (D90) of the fillers, the filler area filling factor, the average of the distances between the fillers ($r_{av}$), and the surface roughness of the substrate surface (Ra1).

(Preparation of Structure 50)

The substrate 100 after polishing was set in a vacuum chamber, and yttria fine particles having an average particle diameter of 0.4 µm were used to generate an aerosol at a nitrogen gas flow rate of 10 L/min, which was sprayed through the nozzle onto the surface of the substrate 100 for formation of an yttria structure to obtain the composite structure 200.

For the obtained composite structure 200, Surfcom 130A manufactured by Tokyo Seimitsu Co., Ltd. was used to measure the thickness of the structure 50 (length in the Z-axis direction). Moreover, the surface of the structure 50 was polished using a 1 μm diamond paste. Hardness was measured at a depth of about 150 nm to 500 nm from the surface of the structure 50 by use of a nanoindenter (ENT-2100 manufactured by Elionix Inc.) and converted into Vickers hardness.

The evaluation was "D" for samples having a thickness of the structure 50 of less than 0.5 μm or a Vickers hardness of HV 50 or less. The evaluation was "C" for samples having a thickness of the structure 50 of 0.5 μm or more and a Vickers hardness of Hv 100 or less. The evaluation was "B" for samples having a thickness of the structure 50 of 0.5 μm or more and a Vickers hardness of Hv 100 to 300. The evaluation was "A" for samples having a thickness of the structure 50 of 0.5 μm or more and a Vickers hardness of Hv 300 or more. Note that, for sample 7, the thickness of the structure was 4 μm and the Vickers hardness HV was 180. For sample 14, the thickness of the structure was 4 μm and the Vickers hardness HV was 80. For sample 16, the thickness was 3 μm and the Vickers hardness HV was 439. For sample 22, the thickness was 3 μm and the Vickers hardness HV was 532. Here, the thickness is an index for structure forming ability, and the Vickers hardness is an index for denseness.

Moreover, for the samples capable of hardness measurement, measurement was carried out on the average crystallite size of the structure 50 by the X-ray diffraction method. The results showed that the average crystallite size was 100 nm or less in each case.

The surface roughness of the second region (Ra2) and the surface roughness of the structure (Ra3) were calculated in accordance with JIS B 0601 using Surfcom 130A manufactured by Tokyo Seimitsu Co., Ltd. For the surface roughness of the structure (Ra3), Ra was as large as 0.1 μm or more for samples with evaluation C and D. Samples with evaluation A and B all had Ra smaller than 0.1 μm, and in particular samples with evaluation A had Ra as small as 0.05 μm or less. In addition, the surface roughness of the second region (Ra2) was less than 0.1 μm for samples having acrylic resin as the second resin. The value was 0.1 μm for samples having CFRP as the second resin. The value was 0.5 μm for samples having alumite as the second resin.

Table 1 shows the results.

TABLE 1

| | | First Region | | | | | | |
|---|---|---|---|---|---|---|---|---|
| | | Matrix Section | Filler | | Surface Shape | | | |
| Sample | Second Region | Type | Type | D90 (μm) | Area Filling Factor (%) | $r_{av}$ (μm) | Ra (μm) | Evaluaton |
| Sample 1 | Acrylic Resin | Epoxy-Based | None | — | 0 | — | 0.30 | D |
| Sample 2 | | Acrylic | Alumina | 0.01 | — | — | — | D |
| Sample 3 | | Epoxy-Based | | 0.1 | 10 | 0.6 | 0.20 | D to C |
| Sample 4 | | Epoxy-Based | | | 27 | 0.4 | 0.15 | D to C |
| Sample 5 | | Epoxy-Based | | | 36 | 0.3 | 0.21 | D to C |
| Sample 6 | | Epoxy-Based | | 1.0 | 2 | 4.1 | 0.09 | D to C |
| Sample 7 | | Epoxy-Based | | | 31 | 0.6 | 0.15 | B |
| Sample 8 | | Epoxy-Based | | | 33 | 0.5 | 0.34 | B |
| Sample 9 | | Epoxy-Based | | 1.4 | 1 | 7.2 | 0.16 | D |
| Sample 10 | | Epoxy-Based | | | 34 | 0.9 | 0.20 | B |
| Sample 11 | | Epoxy-Based | | | 35 | 0.8 | 0.11 | B |
| Sample 12 | | Epoxy-Based | | 3.0 | 10 | 5.0 | 0.23 | D |
| Sample 13 | | Epoxy-Based | | | 17 | 4.6 | 0.20 | C |
| Sample 14 | | Epoxy-Based | | | 24 | 3.1 | 0.19 | C |
| Sample 15 | | Epoxy-Based | | | 24 | 2.9 | 0.20 | C |
| Sample 16 | | Epoxy-Based | | | 32 | 0.6 | 0.19 | A |
| Sample 17 | | Epoxy-Based | Glass Beads | 5.0 | 16 | 2.6 | 0.19 | C |
| Sample 18 | | Epoxy-Based | | | 19 | 2.4 | 0.25 | C |
| Sample 19 | | Epoxy-Based | | | 24 | 2.3 | 0.18 | C |
| Sample 20 | | Epoxy-Based | | | 35 | 1.1 | 0.18 | A |
| Sample 21 | | Epoxy-Based | | | 48 | 0.9 | 0.20 | A |
| Sample 22 | | Epoxy-Based | | | 49 | 1.2 | 0.19 | A |
| Sample 23 | | Epoxy-Based | | | 51 | 0.8 | 0.22 | A |
| Sample 24 | | Epoxy-Based | | | 58 | 0.8 | 0.38 | A |
| Sample 25 | | Epoxy-Based | | | 61 | 0.8 | 0.42 | A |
| Sample 26 | | Epoxy-Based | | | 67 | 0.7 | 0.39 | A |
| Sample 27 | | Epoxy-Based | | 10.0 | 46 | 1.4 | 0.18 | A |
| Sample 28 | | Epoxy-Based | | | 57 | 0.6 | 0.28 | A |
| Sample 29 | | Acrylic | | | 77 | 0.6 | 0.81 | D |
| Sample 30 | | Epoxy-Based | | | 80 | 0.4 | — | D |
| Sample 31 | | Epoxy-Based | | 45.0 | 45 | 3.4 | 0.44 | B |
| Sample 32 | | Epoxy-Based | | | 50 | 2.0 | 0.41 | B |
| Sample 33 | | Epoxy-Based | | | 52 | 2.4 | 0.33 | B |
| Sample 34 | | Epoxy-Based | | 63.0 | 74 | 3.0 | 6.07 | D |
| Sample 35 | | Urethane-Based | SUS316 | 3 | 48 | 0.6 | 0.25 | B |
| Sample 36 | | Styrene Butadiene-Based | | | 42 | 1.1 | 0.25 | B |
| Sample 37 | | Epoxy-Based | SUS316 | 3 | 45 | 0.9 | 0.14 | B |
| Sample 38 | CFRP | Epoxy-Based | Alumina | 1.4 | 35 | 0.8 | | B |
| Sample 39 | Alumite | Epoxy-Based | Alumina | 1.4 | 35 | 0.8 | 0.17 | A |

Sample 1 with no fillers 20 added had a scraped off matrix section 10 and no structure 50 formed. Sample 2 employing fine fillers 20 having D90 of 0.01 μm had only scraped off fillers and no structure 50. In addition, in the case of using small fillers 20 having D90 of 0.1 μm, it was not possible to allow both of the area filling factor and the average of the distances between the fillers ($r_{av}$) to be included in the predetermined range or, even when successfully included within the predetermined range, it was not possible to obtain the dense structure 50 because the Vickers hardness was 100 or less. In addition, an attempt to obtain a denser structure by changing the formation conditions failed to obtain the dense structure 50. In the case of a filler diameter of 1.0 μm or more, samples 9 and 12 each having a filler area filling factor as small as 10% or less had a scraped off matrix section 10 and no structure 50 formed. Additionally, sample 6 having a filler area filling factor as small as 10% or less had a structure formed but no dense structure obtained. An attempt to obtain a denser structure by changing the formation conditions failed to obtain the dense structure 50. Samples 29, 30, and 34 having a filler area filling factor of 70% or more were not able to obtain a good structure due to e.g. formation into a green compact or detachment of fillers. Other samples were a composite structure having a structure thickness of 2 to 30 μm and provided with a relatively dense structure.

REFERENCE SIGNS LIST 10 matrix section
20 filler
30 aerosol deposition apparatus
50 structure
60 fiber
100 substrate
100a substrate surface
101 first region
102 second region
200 composite structure
301 gas generation source
302 pipe
303 aerosol generator
304 pipe
305 chamber
306 nozzle
307 position control means
308 stage
309 vacuum pump

What is claimed is:

1. A composite structure comprising:
a substrate; and
a structure which is provided on a surface of the substrate and which contains a brittle material as a main component, wherein
the structure is polycrystalline and an average crystallite size of the structure is 100 nm or less,
the substrate at least includes a first region including the substrate surface,
the first region includes
a matrix section which contains a first resin as a main component and
fillers,
a 90% particle diameter (D90) of the fillers is 1.0 μm or more and 60 μm or less, and
a filler area filling factor per unit area in the substrate surface is larger than 10% and 70% or less.

2. The composite structure according to claim 1, wherein an average of distances between the fillers ($r_{av}$) in the substrate surface is 0.5 μm or more and less than 5.0 μm.

3. The composite structure according to claim 1, wherein an average of distances between the fillers ($r_{av}$) in the substrate surface is 0.5 μm or more and 2.0 μm or less.

4. The composite structure according to claim 1, wherein the filler area filling factor per unit area in the substrate surface is 25% or more.

5. The composite structure according to claim 1, wherein a surface roughness (Ra) of the substrate surface is larger than 0.1 μm.

6. The composite structure according to claim 1, wherein a surface roughness (Ra) of the substrate surface is larger than 0.2 μm.

7. The composite structure according to claim 1, wherein a surface roughness (Ra) of the substrate surface is larger than 0.25 μm.

8. The composite structure according to claim 1, wherein the surface roughness (Ra) of the substrate surface is less than 5 μm.

9. The composite structure according to claim 1, wherein the surface roughness (Ra) of the substrate surface is less than 1 μm.

10. The composite structure according to claim 1, wherein the surface roughness (Ra) of the substrate surface is less than 0.5 μm.

11. The composite structure according to claim 1, wherein DHV2 of the first resin constituting the matrix section of the first region is 40 or more or less than 7.

12. The composite structure according to claim 1, wherein the first resin constituting the matrix section of the first region contains at least one resin component selected from the group consisting of epoxy, polymethyl methacrylate, urethane, styrene butadiene, polypropylene, polycarbonate, polystyrene, acrylonitrile butadiene styrene copolymers (ABS), polyethylene terephthalate (PET), polytetrafluoroethylene (PTFE), polyimide, and glass epoxy.

13. The composite structure according to claim 1, wherein the substrate further includes a second region other than the first region.

14. The composite structure according to claim 13, wherein
the second region contains a second resin as a main component.

15. The composite structure according to claim 14, wherein
the second resin of the second region is the same as the first resin of the first region.

16. The composite structure according to claim 14, wherein
the second resin of the second region is different from the first resin of the first region.

17. The composite structure according to claim 13, wherein
the second region is porous.

18. The composite structure according to claim 13, wherein
a surface roughness (Ra) of a surface of the second region in contact with the first region is 0.3 μm or more.

19. The composite structure according to claim 13, wherein
when a direction from the substrate to the structure is defined as a Z-axis direction, a length of the structure in the Z-axis direction is larger than 1 μm.

20. The composite structure according to claim 13, wherein
the average crystallite size of the structure is 50 nm or less.

21. The composite structure according to claim 13, wherein the average crystallite size of the structure is 30 nm or less.

22. The composite structure according to claim 13, wherein
a surface roughness (Ra) of a surface of the structure is 0.05 μm or less.

\* \* \* \* \*